United States Patent [19]

Kashima et al.

[11] Patent Number: 4,873,131

[45] Date of Patent: Oct. 10, 1989

[54] OPTICAL RECORDING MEDIUM

[75] Inventors: Toshihiro Kashima, Ootsu; Minoru Fukuda, Nagaokakyo, both of Japan

[73] Assignee: Toyo Boseki Kabushiki Kaisha, Osaka, Japan

[21] Appl. No.: 172,142

[22] Filed: Mar. 23, 1988

[30] Foreign Application Priority Data

| Mar. 23, 1987 | [JP] | Japan | 62-69736 |
| Mar. 30, 1987 | [JP] | Japan | 62-79397 |
| Apr. 8, 1987 | [JP] | Japan | 62-85948 |
| Apr. 9, 1987 | [JP] | Japan | 62-87673 |
| Jul. 2, 1987 | [JP] | Japan | 62-165943 |
| Jul. 7, 1987 | [JP] | Japan | 62-170443 |

[51] Int. Cl.$^4$ .......................... B32B 3/02; G11B 3/70
[52] U.S. Cl. ........................ 428/64; 428/65; 428/204; 428/913; 428/920; 430/270; 430/271; 430/945; 369/288; 346/766; 346/135.1; 346/137
[58] Field of Search ............. 430/270, 271, 945; 428/64, 65, 204, 913, 920; 369/288; 346/76 L, 135.1, 137

[56] References Cited

U.S. PATENT DOCUMENTS

| 4,298,975 | 11/1981 | van der Veen et al. | |
| 4,492,750 | 1/1985 | Law et al. | |
| 4,619,990 | 10/1986 | Elmasry | 430/964 |
| 4,626,496 | 12/1986 | Sato | 430/945 |
| 4,626,497 | 12/1986 | Roth et al. | 430/9 |
| 4,666,819 | 5/1987 | Elmasry | 430/945 |
| 4,713,314 | 12/1987 | Namba et al. | 430/945 |
| 4,719,613 | 1/1988 | Hirose et al. | 369/288 |
| 4,766,054 | 8/1988 | Hirose et al. | 430/270 |
| 4,770,975 | 9/1988 | Hirose et al. | 430/271 |

Primary Examiner—Ellis P. Robinson
Assistant Examiner—P. J. Ryan
Attorney, Agent, or Firm—Wegner & Bretschneider

[57] ABSTRACT

An optical recording medium having a thin film layer consisting mainly of an organic dye and formed on a substrate and characterized in that said thin film layer consists mainly of a dye mixture comprising a polymethine dye (A) and an aza-annulene dye (B).

3 Claims, No Drawings

OPTICAL RECORDING MEDIUM

This invention relates to an optical recording medium having an organic recording layer absorptive in the near infrared range and useful for semiconductor lasers.

Recently, development of semiconductor lasers is noticeable and small-sized and stable oscillators have become cheaply available and are now being used as a light source in various recording devices. However, the wavelength of the semiconductors of the type is limited to fall within a relatively long wavelength range, and semiconductor lasers usable for oscillation of a light having a short wavelength are problematic in the life, output power, etc. Accordingly, it would be essential to use a material absorptive in the near infrared range as a thin film layer for recording media for use with semiconductor lasers, and a material having a wavelength of maximum absorbance of 750 μm or less would be unsuitable. Hitherto, in the recording medium of this type, a thin film layer formed on a substrate is exposed to a laser light to form pits thereon, whereby the information recorded could be read out by utilization of the difference in reflectivity between the pit-formed portion and the non-pit-formed portion on the said layer. The constitution of the recording layer for such recording and reproduction (reading-out) may comprise two or more layers of a thin film-forming layer for recording and a reflection layer, but it advantageously comprises only the recording thin layer which has both the above-mentioned functions. When the recording thin layer is in the form of a single layer, the material for the said recording thin layer is required to have a high reflectivity by itself in order to obtain a high S/N ratio. The recording media of this kind are known to include low melting point metal-containing materials, such as those containing Te or its alloy, as inorganic materials, and cyanine dye- or phthalocyanine dye-containing materials as organic materials.

Although inorganic optical recording media containing a Te base alloy have a relatively high sensitivity and are useful, these are problematic in the toxicity. Further, these have additional defects that the installation cost for film layer formation is high and the productivity is low, since the film formation is effected by sputtering or the like. On the other hand, optical recording media with an organic thin film layer containing a cyanine dye are advantageous as these can be produced by a relatively inexpensive method such as spin-coating method or the like. In the present situation, however, these are not as yet satisfactory on the characteristics thereof, for example, the storage stability (durability), etc. Specifically, naphthoquinone or anthraquinone compounds are poor in the solubility in solvents and these are problematic in the storage stability, for example, because of formation of agglomerates during storage, etc. Further, phthalocyanine compounds are also insufficent in various characteristics, for example, solubility in solvents, matching property with laser diodes, change in crystalline structure during storage, etc.

We have made extensive research work to provide a thin film layer material for recording and reproduction in an optical recording medium, which is highly sensitive to the light in the near infrared range and has a high solvent-solubility and a high reflectivity, but is not toxic, and which is excellent also in the durability, so as to provide a practical optical recording medium with an excellent property, and have accomplished the present invention.

Thus, the present invention is an optical recording medium having a thin film layer consisting mainly of an organic dye and formed on a substrate, characterized in that said thin film layer consists mainly of a dye mixture comprising a polymethine dye (A) and an aza-annulene dye (B).

The aza-anuulene dye for use in the present invention is a cyclic hydrocarbon having —C=N— bonds and composed by containing conjugated double bonds in the molecule (dye), in which the total of the carbon and nitrogen atoms taking part in the conjugated structure is 10 or more. Examples of such dyes include tetrabenzoporphine or porphine, phthalocyanine and derivatives thereof, naphthalocyanine and derivatives thereof, and preferably, phthalocyanine dyes and naphthalocyanine dyes.

For more specific examples of these dyes (B), references may be made to Japanese patent kokai (lay-open) Nos. 209583/85, 154888/86, 246091/86, 39286/87, 177287/86, 235188/86, 64597/87, 23451/85, 184565/85, 25886/86, 215662/86, 163891/86, 163892/86, 268487/86, 39286/87, etc. Among these phthalocyanine dyes and naphthalocyanine dyes those mentioned below are preferable: Phthalocyanine compounds of the formula (I):

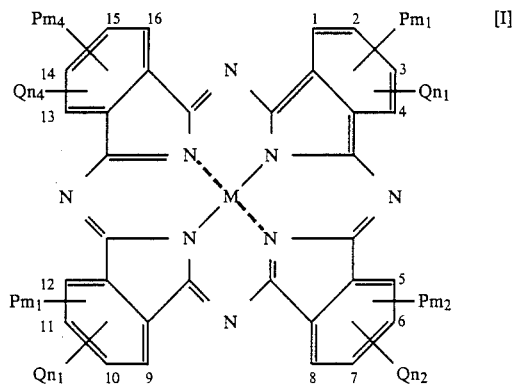

wherein the numerals 1 to 16 denote the respective carbon atom postions; each of $m_1$, $m_2$, $m_3$ and $m_4$ represents the number of groups P which may be same or different and the number is an integer of from 0 to 4; each of $n_1$, $n_2$, $n_3$ and $n_4$ represents the number of groups Q which may be same or different and the number is an integer of from 0 to 4; two or more of the carbon atoms bearing the numbers 1 to 16 are substituted by the groups P which are selected from amino, substituted amino, imino, nitro, cyano, sulfonic acid, sulfonate, sulfonyl, hydroxyl and halogen; 3 to 8 of the carbon atoms bearing the numbers 1 to 16 are substituted by the groups Q; Q is represented by $(Z)_rR$ wherein Z represents —$CH_2$—, —O—, —CONH— or —COO— and R represents a straight or branched alkyl group or aryl group and r represents a number of 0 or 1; and M represents hydrogen, metal, metal oxide, metal hydroxide or metal halide.

Naphthalocyanine compounds of the formula (II):

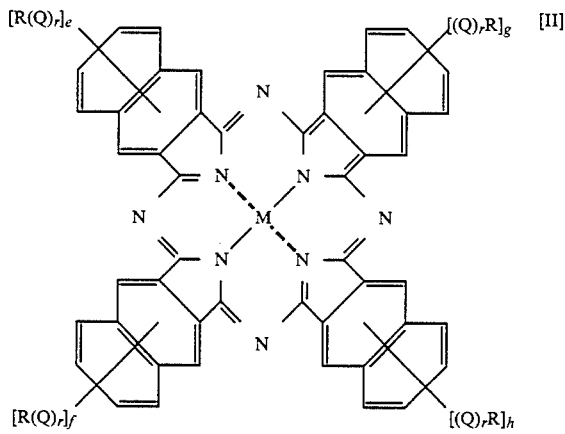

[II]

wherein -[(Q)$_r$R] represents substituents which may be same or different, Q is any of —O—, —CONR'—, —NR'CO—, —COO— and —OCO, wherein R' is hydrogen or alkyl group having 4 or less carbon atoms, R represents a group selected from straight or branched alkyl groups having 4 to 18 carbon atoms, and aryl and cyclohexyl groups having 6 to 18 carbon atoms; e, f, g and h represent the numbers of the respective substituents and each of them is a number of 0 to 4; (e+f+g+h) being $\geq 3$; M represents hydrogen, metal, metal oxide, metal hydroxide or metal halide; and r represents a number of 0 or 1.

However, the naphthalocyanine dyes are not limited to these particular ones.

The polymethine dyes (A) for use in the present invention are, although not specifically limited, for example, selected from dye groups of cyanine dyes, pyrylium dyes, thiopyrilium dyes, croconium dyes, azulenium dyes and the like, which are described in "Tokushu Kino Shikiso" (CMC, pages 77–80).

Among these polymethine dyes (A) those mentioned below are preferable: Polymethine compounds of the formula (III):

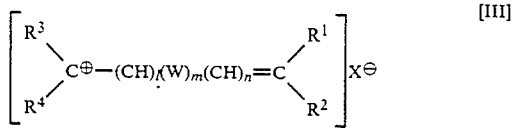

[III]

wherein each of $R^1$, $R^2$, $R^3$ and $R^4$ represents hydrogen atom, alkyl group, substituted alkyl group, aryl group, substituted aryl group or heterocyclic group; W represents a cyclohexene ring or a condensed ring containing at least one cyclohexene ring or at least one substituted cyclohexene ring; each of l and n represents 0 or an integer of 1 to 3 and satisfies the relation $0 \leq l+n \leq 5$; m is a number of 0 or 1; and $X^{\ominus}$ represents an anion.

Cyanine dyes of the formula (IV):

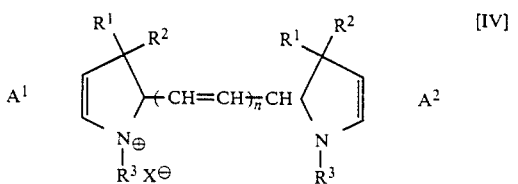

[IV]

wherein n is 0 or an integer of from 1 to 3; $R^1$, $R^2$ and $R^3$ may be same or different and each represents an alkyl group having 1 to 6 carbon atoms; X represents halogen, perhalogenate, boron tetrafluoride, toluenensulfonate or alkyl sulfate; each of $A^1$ and $A^2$ represents benzene ring or naphthyl ring and each of these rings may be substituted by any of alkyl groups, alkoxy groups, hydroxyl group, carboxyl group, halogen, aryl groups and alkylcarboxyl groups.

The ratio of the dye (A) to dye (B), i.e. (A)/(B) is 95/5 to 10/90, preferably 80/20 to 25/75, by weight.

However, the polymethine dyes are not limited to these specific ones.

The above-mentioned dyes (A) and (B) for use in the present invention are preferably selected from those having a reflectivity of 10% or more at 830 nm wavelength. Above all, the dyes (A) and (B) are especially preferably those in which the maximum absorption wavelength $\lambda_{max}$·A(nm) of the dye (A) and the maximum absorption wavelength $\lambda_{max}$·B(nm) of the dye (B) satisfy the relation defined by the formula:

$$-80 \leq \lambda_{max}\cdot B - \lambda_{max}\cdot A \leq 300$$

The measurement of the reflectivity and wavelength of maximum absorbance was conducted as follows. Thus a dye was dissolved in dichloroethane to be a 1.5% (by weight) solution, which was spin-coated on a glass substrate to form a thin film layer of a thickness of 70 nm. The absorption and reflection spectra of this sample were measured by UV-VIS spectrometer. Then the wavelength of maximum absorbance ($\lambda_{max}$) and reflectivity (R%) at 830 nm were calculated.

When the dye (A) or dye (B) is composed of two or more kinds of dyes, each of $\lambda_{max}$A or $\lambda_{max}$B is defined as a sum of $\lambda_{max}$X W where W is a weight fraction of the dyes composing the dye (A) or dye (B).

In case of an optical recording medium with a thin film layer consisting mainly of a dye mixture of the dye (A) and dye (B), the thin film layer is preferable to be such that the initial reflectivity of the thin film layer is 20% or more and the reflectivity of the thin film layer after the irradiation for 200 hours with sunshine carbon arc Fade-O-Meter (63° C., 65%R.H.) is 70% or more of the initial reflectivity. In the dye mixture of the dye (A) and dye (B), each of the dye (A) and dye (B) may be either a single kind of a dye or a mixture of two or more kinds of dyes.

The measurement of reflectivity of the thin film layer was conducted in the following manner. Thus a thin layer in a thickness of 70 nm was formed on a substrate and measurement was conducted with the use of UV-IVS spectrometer. The initial reflectivity means a maximum reflectivity at a wavelength of 600–900 nm before irradiation with sunshine carbon arc Fade-O-Meter; and the reflectivity after irradiation with sunshine carbon arc Fade-O-Meter means a maximum reflectivity at a wavelength of 600–900 nm after irradiation for 200 hours with sunshine carbon arc Fade-O-Meter.

In the optical recording medium of the present invention, the thin film layer consisting mainly of a dye mixture may optionally contain, together with the dyes (A) and (B), an antioxidant, a lubricant, an antistatic agent, a polymer compound as a binder, other dyes and/or a sensitizer, provided that the additives do not injure the object of the present invention.

For the dyes to be used in the present invention, especially for the dye (B), a dye polymer can be used which may be formed by introducing a polymer chain into the substituent of the dye or by introducing a polymerizable group into the dye followed by polymerizing the thus introduced polymerizable group at any desired time.

Incorporation of an amine compound into the dye mixture system for use in the present invention is preferred, as yielding a better result.

Preferred amine compounds for use in the present invention are those having the following formula (V):

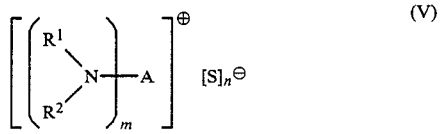

wherein $R^1$ and $R^2$ each represent hydrogen, a substituted or unsubstituted alkyl group, a substituted or unsubstituted aryl group or a substituted or unsubstituted heterocyclic group; and A represents

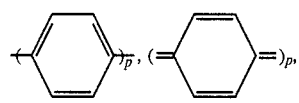

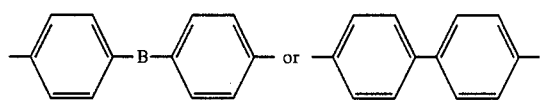

Among the above-mentioned organic groups, the aromatic group may be substituted by an alkyl, alkoxy, halogen or hydroxyl group or this may not be substituted. —B— means an alkylidene group, —S— or —SO$_2$—. p means a number of 1 or 2; m means a number or 1 or 2; n means 0, 1 or 2; and [S] represents an anion. Specific examples of the said amine compounds are mentioned below.

In the amine compounds shown below, CH$_3$- is referred to as "Me"; C$_2$H$_5$— as "Et"; n—C$_3$H$_7$— as "Pr"; t—C$_4$H$_9$— as "Bu"; and n—C$_6$H$_{13}$— as "Hx". The respective compounds are accompanied by the abbreviation thereof as parenthesized.

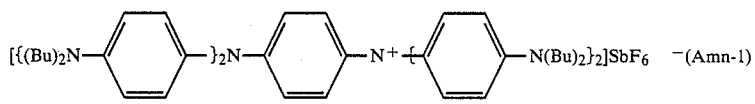

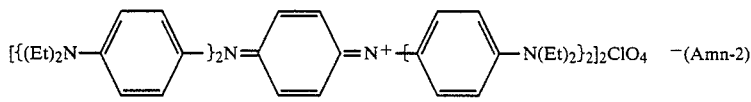

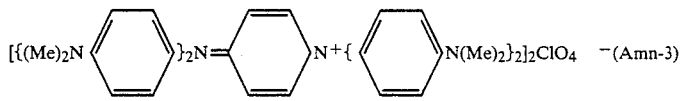

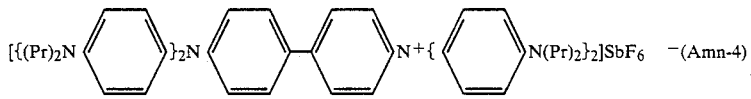

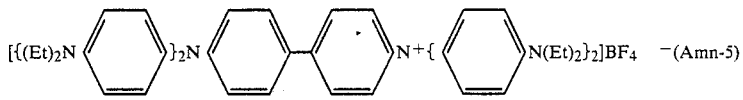

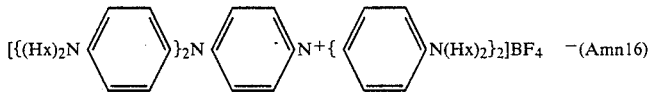

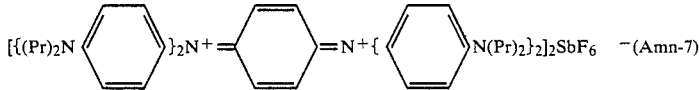

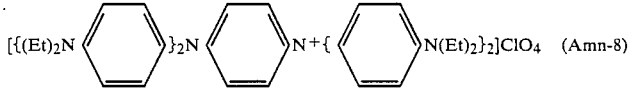

The amount of the amine to be used is 2 to 45%, preferably 5 to 20%, by weight, based on the sum of the amounts of the amine, dye (A) and dye (B).

The substrate material for use in the present invention may be either transparent or opaque (non-transparent) to the laser light used. However, for recording in writing with a laser light from the side of the substrate, the substrate material must be transparent to the laser light.

The substrate materials include glass, acrylic resins, methacrylic resins, polyester resins, nitrocellulose resins, polyamide resins, polycarbonate resins, polymethylpentene-1 resins, epoxy resins, vinyl chloride resins, polyparaphenylene resins, etc. These resins are in the form of sheet, film, disc or the like, which may optionally have a subbing layer or a layer on which a certain metal has been vapour-deposited in accordance with necessity.

In forming a dye film layer, the dye mixture (and amine and any other additive, when used) is(are) dissolved in a proper solvent. The solution is coated on a substrate in any proper manner, e.g., by spin coating. Then the coating is dried to form a thin film layer of 100 to 2000 Å, preferably 400 to 1000 Å, in thickness.

Except the use of such particular dye mixture, the optical recording medium of the present invention may be of any conventional one in the structure, use (recording and reproduction), etc. which is well known per se in the art of optical recording medium having a thin film layer of an organic dye.

The present invention will be explained in greater detail hereunder by reference to examples. Measurement and evaluation of the characteristics in the examples were effected as mentioned below.

MEASUREMENT OF SOLUBILITY

A test tube was charged with 250 mg of a polymethine dye and 5 ml of dichloroethane for dissolution at room temperature. Upon complete dissolution of the polymethine dye, 1 g of an aza-annulene dye was added to the solution. After closing the opening of the test tube with a stopper, the dye was dissolved by applying ultrasonic waves thereto for 30 minutes at 50° C. Then the solution was left standing at room temperature for 1 hour and filtered at 25° C. to measure the solubles to determine solubility.

ABSORPTION SPECTRUM AND REFLECTIVITY

A mixture of an aza-annulene dye and polymethine dye in a prefetermined ratio was dissolved in dichloroethane so as to be 1.5% (by weight) solution. Then the solution was spin coated on a glass substrate to form a thin film layer of a thickness as solid of 70 nm. The absorption spectrum and reflectivity thereof were measured with UV-VIS spectrometer (Shimadzu UV 210A). From these values the maximum absorption wavelength ($\lambda_{max}$) and reflectivity (R%) at 830 nm were determined.

RECORDING CHARACTERISTICS

The thin film layer formed on the substrate in the same manner as that mentioned in the aforesaid item "Absorption Sepctrum and Reflectivity" was recorded with a laser diode of 830 nm with a light power of 10 mW the lens aperture being 1 μm. Next, with the same laser light source (0.2 mW) as a reading-out light, the width of the light pulse for recording with which the C/N ratio of the reflected light could be 50 dB or more was measured, and the reciprocal of recording sensitivity was calculated therefrom.

DURABILITY

The thin film layer formed on the substrate in the same manner as that mentioned in the aforesaid item "Absorption Spectrum and Reflectivity" was stored in an atmosphere of 70° C. and 90%RH for 5000 Hrs, and then the reflectivity and C/N ratio after the storage was measured. The thus measured value was compared with the value measured before storage in the said atmosphere.

LIGHT DURABILITY

A recording medium was irradiated with a sunshine carbon arc Fade-O-Meter at 63° C. for 200 hours, and then the reflectivity and C/N ratio were measured to examine the deterioration, if any.

EXAMPLES 1-6 AND COMPARATIVE EXAMPLES 1-3

The naphthalocyanine dye (referred to as α) of the formula (II) and polymethine dye (referred to as β) of the formula (III) indicated in Table 1 were mixed in a predetermined ratio (weight ratio α/β shown in the Table) and dissolved in dichloroethane and the solution was spin coated on a glass substrate to form a thin film layer so as to be a thickness as solid of 70 nm. The resulting recording medium was measured and evaluated in respect of various characteristics. The results are shown in Table II. In Table I and Table III the letter N indicates the sum of the values e, f, g and h in the formula (II) for the respective naphthalocyanine dyes.

TABLE 1

| No. | Naphthalocyanine (α) | | | Polymethine (β) | | | | | |
|-----|---|---|---|---|---|---|---|---|---|
| | (Q) r R | N | M | $R_1$–$R_4$ | l | n | (W) m | $X^\ominus$ | α/β |
| Ex. 1 | —CONHBu | 4 | Tio | $R_1$ : —⟨C6H4⟩—N(Me)$_2$ <br> $R_2$ : " <br> $R_3$ : —⟨C6H4⟩—N(Et)$_2$ <br> $R_4$ : " | 1 | 2 | — | $ClO_4^\ominus$ | 50/50 |

TABLE 1-continued

| No. | Naphthalocyanine (α) (Q) r R | N | M | Polymethine (β) R₁~R₄ | | l | n | (W) m | X⁻ | α/β |
|---|---|---|---|---|---|---|---|---|---|---|
| 2 | —Am | 6 | Cu | R₁ | H | 0 | 0 | (cyclohexene with two methyl groups) | ClO₄⁻ | 50/50 |
| | | | | R₂ | -C₆H₄-N(Me)₂ | | | | | |
| | | | | R₃ | H | | | | | |
| | | | | R₄ | -C₆H₄-N(Me)₂ | | | | | |
| 3 | -O-C₆H₅ | 4 | VO | R₁ | -C₆H₄-N(Et)₂ | 1 | 2 | — | ClO₄⁻ | 50/50 |
| | | | | R₂ | " | | | | | |
| | | | | R₃ | " | | | | | |
| | | | | R₄ | " | | | | | |
| Ex. 4 | —Bu/—Am | 6 | VO | R₁ | -C₆H₄-OMe | 1 | 2 | — | I⁻ | 50/50 |
| | | | | R₂ | " | | | | | |
| | | | | R₃ | " | | | | | |
| | | | | R₄ | " | | | | | |
| 5 | —COOHe | 8 | Ni | R₁ | —H | 0 | 0 | Cl (cyclohexene with two methyl groups) | I⁻ | 50/50 |
| | | | | R₂ | -C₆H₅ | | | | | |
| | | | | R₃ | —H | | | | | |
| | | | | R₄ | -C₆H₅ | | | | | |
| 6 | —ODd | 4 | VO | R₁ | —H | 0 | 0 | (octahydronaphthalene with two methyl groups) | I⁻ | 50/50 |
| | | | | R₂ | -C₆H₅ | | | | | |
| | | | | R₃ | —H | | | | | |
| | | | | R₄ | -C₆H₄-N(Me)₂ | | | | | |

TABLE 1-continued

| No. | Naphthalocyanine (α) (Q) r R | N | M | R₁~R₄ | Polymethine (β) l | n | (W) m | X⁻ | α/β |
|---|---|---|---|---|---|---|---|---|---|
| Comp. Ex. 1 | —Bu | 2 | Tio | R₁ —⟨C₆H₄⟩—N(Me)₂ | 0 | 0 | (cyclohexene ring) | ClO₄⁻ | 50/50 |
|  |  |  |  | R₂ " |  |  |  |  |  |
|  |  |  |  | R₃ " |  |  |  |  |  |
|  |  |  |  | R₄ " |  |  |  |  |  |
| 2 | —CONHEt | 4 | Ni | R₁ —H | 1 | 2 | — | ClO₄⁻ | 50/50 |
|  |  |  |  | R₂ —⟨C₆H₅⟩ |  |  |  |  |  |
|  |  |  |  | R₃ —H |  |  |  |  |  |
|  |  |  |  | R₄ —⟨C₆H₅⟩ |  |  |  |  |  |
| 3 | —Am | 6 | VO | R₁ —⟨C₆H₄⟩—N(Et)₂ | 3 | 4 | — | I⁻ | 50/50 |
|  |  |  |  | R₂ " |  |  |  |  |  |
|  |  |  |  | R₃ " |  |  |  |  |  |
|  |  |  |  | R₄ " |  |  |  |  |  |

Note (1) Abbreviation for alkyl groups:
Me: methyl group, Et: ethyl group
Bu: butyl group, Am: t-amyl group
He: hexyl group, Dd: dodecyl group

TABLE II

| No. | Solubility (%) | Reflectivity λ max (nm) | Recording R(%) | Reciprocal of Read-out Sensitivity (ns) | Durability C/N (dB) | R(%) | C/N (dB) |
|---|---|---|---|---|---|---|---|
| Ex. 1 | 6.2 | 812 | 30 | 90 | 54 | 29 | 53 |
| Ex. 2 | 8.5 | 810 | 29 | 90 | 53 | 28 | 53 |
| Ex. 3 | 6.8 | 815 | 20 | 88 | 53 | 28 | 52 |
| Ex. 4 | 7.9 | 812 | 30 | 87 | 53 | 28 | 53 |
| Ex. 5 | 8.6 | 802 | 31 | 95 | 54 | 30 | 53 |
| Ex. 6 | 6.5 | 845 | 28 | 89 | 54 | 26 | 53 |
| Comp. Ex. 1 | 0.1 or less | 810 | 32 | 75 | 54 | 11 | 22 |
| Comp. Ex. 2 | " | 807 | 31 | 70 | 54 | 13 | 23 |
| Comp. Ex. 3 | 8.0 | 945 | 22 | 320 | 28 | 9 | 20 |

Note (1): The solubility means a value for naphthalocyanine compound.

EXAMPLES 7-12 AND COMPARATIVE EXAMPLES 4-7

The naphthalocyanine dye and polymethine dye indicated in Table III were mixed in a predetermined ratio and then dissolved in dichloroethane and the solution was coated on a glass substrate with a spin coater to form a thin film layer so as to be a thickness as solid of 70 nm. The resulting recording medium was measured and evaluated in respect of various characteristics. The results are shown in Table IV.

TABLE III

| No. | Naphthalocyanine (α) (Q) r R | N | M | R₁~R₄ | Polymethine (β) l | n | (W)m | X⁻ | α/β |
|---|---|---|---|---|---|---|---|---|---|
| Comp. Ex. 4 | —COOHe | 4 | VO | —⟨C₆H₄⟩—N(Et)₂ | 0 | 0 | (cyclohexene ring) | ClO₄⁻ | 100/0 |
| Ex. 7 | " | " | " | " | " | " | " | " | 75/25 |
| Ex. 8 | " | " | " | " | " | " | " | " | 50/50 |

TABLE III-continued

| No. | Naphthalo-cyanine (α) (Q)rR | N | M | Polymethine (β) R₁~R₄ | l | n | (W)m | X⊖ | α/β |
|---|---|---|---|---|---|---|---|---|---|
| Ex. 9 | " | " | " | " | " | " | " | " | 25/75 |
| Comp. Ex. 5 | " | " | " | " | " | " | " | " | 0/100 |
| Comp. Ex. 6 | —Am | 6 | Tio | 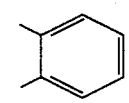 | 1 | 2 | — | I⊖ | 100/0 |
| Ex. 10 | " | " | " | " | " | " | " | " | 75/25 |
| Ex. 11 | " | " | " | " | " | " | " | " | 50/50 |
| Ex. 12 | " | " | " | " | " | " | " | " | 25/75 |
| Comp. Ex. 7 | " | " | " | " | " | " | " | " | 0/100 |

TABLE IV

| No. | λ max (nm) | Reflectivity R(%) | Reciprocal of Recording Sensitivity (ns) | Read-out C/N (dB) | Durability R(%) | C/N (dB) |
|---|---|---|---|---|---|---|
| Comp. Ex. 4 | 828 | 20 | 115 | 53 | 20 | 53 |
| Ex. 7 | 823 | 32 | 81 | 54 | 30 | 54 |
| Ex. 8 | 820 | 35 | 78 | 53 | 33 | 53 |
| Ex. 9 | 820 | 35 | 75 | 54 | 33 | 53 |
| Comp. Ex. 5 | 820 | 36 | 72 | 55 | 12 | 20 |
| Ex. 6 | 825 | 19 | 125 | 53 | 19 | 53 |
| Ex. 10 | 823 | 32 | 83 | 53 | 31 | 53 |
| Ex. 12 | 822 | 35 | 76 | 54 | 33 | 53 |
| Comp. Ex. 7 | 822 | 35 | 74 | 54 | 11 | 22 |

According to the present invention, optical recording media with well balanced characteristics in which only the merits of naphthalocyanine dyes and cyanine dyes are taken but the drawbacks thereof are complemented each other can be obtained. Further, optical recording media which may cope with the necessary requisites and various limitations in production process can be obtained by selection of the both dyes and selection of the mixture ratio thereof from numerous combinations of the dyes.

EXAMPLES 13-19 AND COMPARATIVE EXAMPLES 8-13

The phthalocyanine dye of the formula (I) and polymethine dye of the formula (IV) indicated in Table V were mixed in a predetermined ratio and dissolved in dichloroethane and the solution was coated on a glass substrate with a spin coater to form a thin film layer so as to be a thickness as solid of 70 nm. The resulting recording medium was measured and evaluated in respect of various characteristics. The results are shown in Table VI. The abbreviation in the Table is explained below. Abbreviation for alkyl groups:

| Me: methyl group, | Et: ethyl group |
|---|---|
| Bu: butyl group, | Am: t-amyl group |
| He: hexyl group, | Hp: heptyl group |
| Dd: dodecyl group | |

TABLE V

| No. | Phthalocyanine (α) P | m | (Z)rR | n | M | Cyanine (β) R₁, R₂ | R₃ | A₁, A₂ | X⊖ | n | α/β |
|---|---|---|---|---|---|---|---|---|---|---|---|
| Ex. 13 | —NH₂ | 4 | —Bu | 4 | TiO | Me | Et | 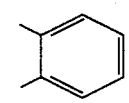 | ClO₄⊖ | 3 | 75/25 |
| Ex. 14 | —Cl | 8 | —O.Hp | 4 | VO | Me | Me | 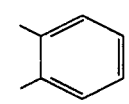 | I⊖ | 3 | 50/50 |
| Ex. 15 | —NO₂ | 3 | —Am | 6 | VO | Me | Me | 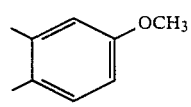 | I⊖ | 3 | 50/50 |

TABLE V-continued

| No. | Phthalocyanine (α) P | m | (Z)rR | n | M | $R_1, R_2$ | $R_3$ | Cyanine (β) $A_1, A_2$ | $X^{\ominus}$ | n | α/β |
|---|---|---|---|---|---|---|---|---|---|---|---|
| Ex. 16 | $-SO_2Cl/-Cl$ | 6 | $-COO.Bu$ | 4 | Ni | Me | Me | methylnaphthyl | $ClO_4^{\ominus}$ | 3 | 50/50 |
| Ex. 17 | $-CN$ | 6 | $-Cu$ | 4 | Cu | Me | Me | chlorodimethylphenyl | $ClO_4^{\ominus}$ | 3 | 50/50 |
| Ex. 18 | $-N(Me)_2$ | 4 | $-NHCO.He$ | 4 | VO | Me | Et | dimethylphenyl | $I^{\ominus}$ | 3 | 25/75 |
| Ex. 19 | $-SO_3H$ | 6 | $-Am$ | 4 | InCl | Me | Me | dimethylphenyl | $I^{\ominus}$ | 3 | 25/75 |
| Comp. Ex. 8 | $-NO_2$ | 3 | $-COO.Am$ | 4 | Cu | — | — | — | — | — | 100/0 |
| Comp. Ex. 9 | — | — | — | — | — | Me | Me | dimethylphenyl | $I^{\ominus}$ | 3 | 0/100 |
| Comp. Ex. 10 | $-CN$ | 1 | $-Bu$ | 5 | Cu | Me | Me | iododimethylphenyl | $I^{\ominus}$ | 3 | 50/50 |
| Comp. Ex. 11 | $-NH_2$ | 6 | $-Bu$ | 2 | TiO | Me | Me | dimethylphenyl | $ClO_4^{\ominus}$ | 3 | 50/50 |
| Comp. Ex. 12 | $-F$ | 6 | $-COO.Dd$ | 10 | TiO | Me | Et | dimethylphenyl | $ClO_2^{\ominus}$ | 3 | 50/50 |
| Comp. Ex. 13 | $-NO_2$ | 3 | $-COO.Am$ | 4 | Cu | Me | Me | dimethylphenyl | $I^{\ominus}$ | 4 | 50/50 |

TABLE VI

| | Solubility (%) | λ max (nm) | Reflectivity R(%) | Reciprocal of Recording Sensitivity (ns) | Readout C/N (dB) | Durability R (%) | Durability C/N (dB) |
|---|---|---|---|---|---|---|---|
| Ex. 13 | 7.3 | 785 | 41 | 130 | 53 | 38 | 52 |
| Ex. 14 | 7.0 | 790 | 37 | 85 | 53 | 35 | 53 |
| Ex. 15 | 9.8 | 795 | 35 | 105 | 51 | 34 | 51 |
| Ex. 16 | 8.0 | 825 | 33 | 92 | 54 | 31 | 53 |
| Ex. 17 | 7.2 | 798 | 35 | 95 | 53 | 34 | 51 |
| Ex. 18 | 7.2 | 785 | 36 | 110 | 51 | 34 | 51 |
| Ex. 19 | 7.5 | 790 | 36 | 98 | 52 | 33 | 51 |
| Comp. Ex. 8 | 8.0 | 803 | 19 | 155 | 54 | 19 | 54 |
| Comp. Ex. 9 | — | 790 | 42 | 65 | 54 | 13 | 26 |
| Comp. Ex. 10 | 7.8 | 795 | 28 | 285 | 32 | 17 | 23 |
| Comp. Ex. 11 | 0.1 or less | 790 | 37 | 68 | 54 | 14 | 25 |
| Comp. Ex. 12 | 11.0 | 785 | 25 | 305 | 30 | 23 | 28 |
| Comp. Ex. 13 | 8.0 | 875 | 25 | 165 | 36 | 15 | 20 |

Notes:

(1) The solubility means a value for phthalocyanine dye.
(2) In Table V, the letter m indicates the sum of the values $m_1$, $m_2$, $m_3$ and $m_4$, and the letter n indicates the sum of the values $n_1$, $n_2$, $n_3$ and $n_4$.

EXAMPLES 20-22

The dye (A) and dye (B) mentioned below were mixed in a predetermined ratio and dissolved in the solvent as indicated in Table VII, and the solution was coated on a glass substrate with a spin coater to form a thin film layer so as to be a thickness as solid of 70 nm. The resulting recording medium was measured and evaluated in respect of various characteristics. The results are shown in Table VII.

A01:

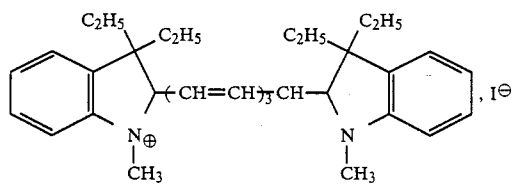

B01:

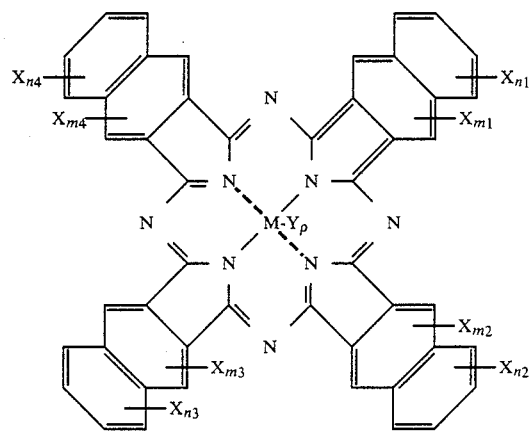

M: Si
Y: —O—Si(C$_6$H$_{13}$)$_3$
X: SO$_2$N[(CH$_2$)$_5$CH$_3$]$_2$
$\Sigma m_i + n_i = 8$
$p = 2$

A02:

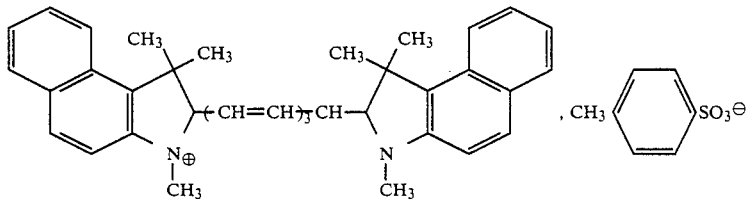

B02:

-continued
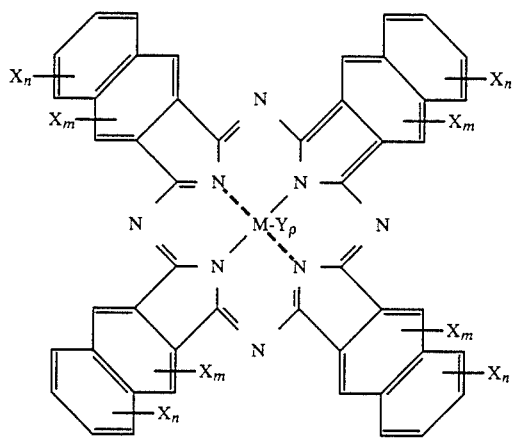
M: V
Y: O
X: $SO_2NH(CH_2)_7CH_3$
$\Sigma n_i = 4$
$\Sigma m_i = 0$
$p = 1$
A03:
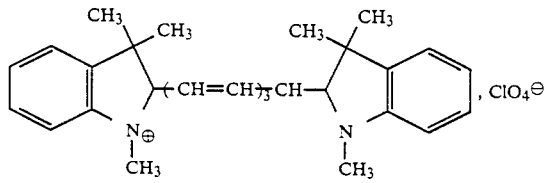
B03:
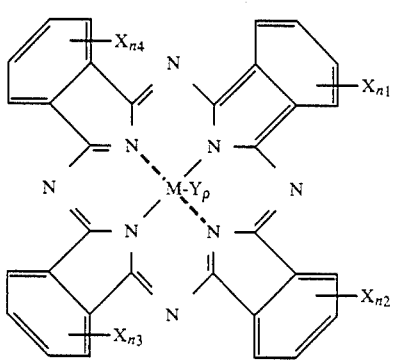
M: Ti
Y: O
X: —S—⟨phenyl⟩—$CH_3$
$\Sigma n_i = 16$
$p = 1$
TABLE VII
| | Ex. 20 | Ex. 21 | Ex. 22 |
|---|---|---|---|
| Dye (A) | A01 | A02 | A03 |
| Dye (B) | B01 | B02 | B03 |
| (A)/(B) (by weight) | 50/50 | 50/50 | 50/50 |
| Solvent | n-butanol | n-butanol | dichloroethane |
| $\lambda max$ (nm) | 815 | 802 | 785 |
| Reflectivity R (%) | 29 | 34 | 27 |
| Reciprocal of Recording Sensitivity (nS) | 110 | 82 | 105 |
| Read-out C/N (dB) | 58 | 56 | 56 |
| Light Durability | | | |
| R (%) | 29 | 33 | 26 |
| C/N (dB) | 58 | 55 | 56 |
| Wet-heat Resistance | | | |
| R (%) | 28 | 32 | 26 |
| C/N (dB) | 57 | 55 | 56 |

EXAMPLES 23–29 AND COMPARATIVE EXAMPLES 14–17

The dyes indicated in Table VIII were mixed in a predetermined ratio and dissolved in dichloroethane, and the solution was coated on a glass substrate with a spin coater to form a thin film layer so as to be a thickness of 70 nm.

The resulting recording meium was measured and evaluated in respect of various characteristics. The results are shown in Table IX.

The dyes in the table VIII were as mentioned below, which were represented by the respective abbreviations. The ratio of the dyes was by weight.

The abbreviations of the substituents in the dyes are as follows:

| Bu: t-butyl, | Me: methyl |
|---|---|
| Am: n-amyl, | Dd: n-dodecyl |
| He: N—hexyl | |

B-1:

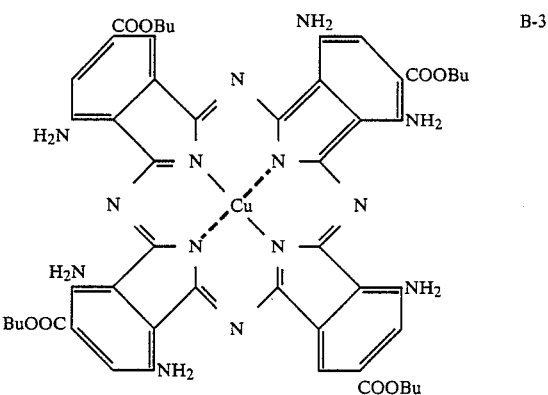

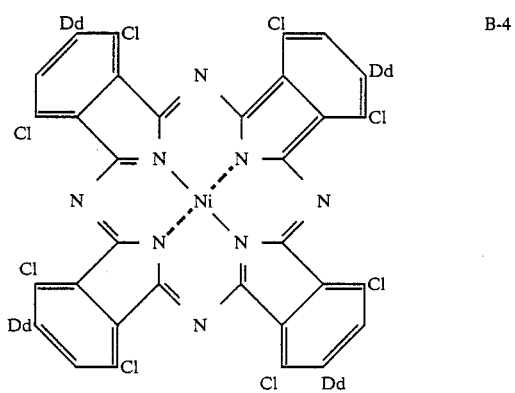

-continued

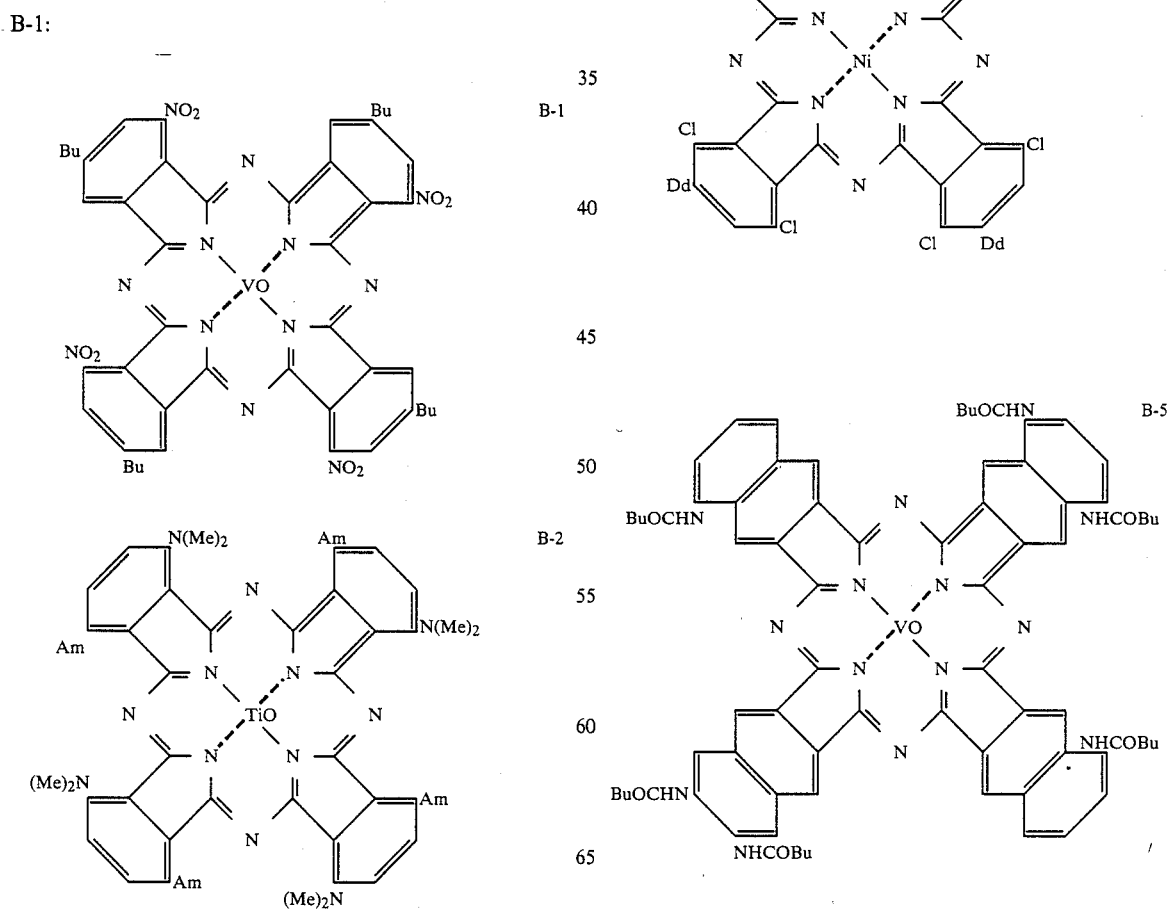

-continued

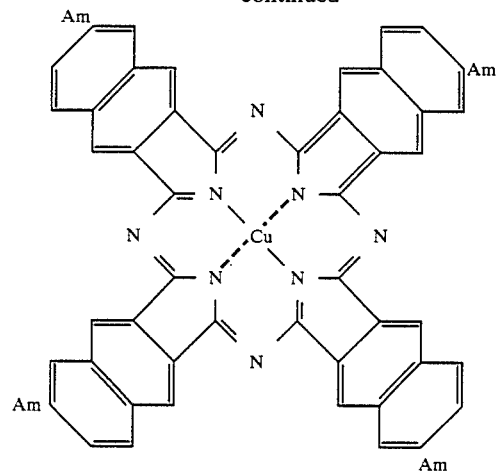
B-6

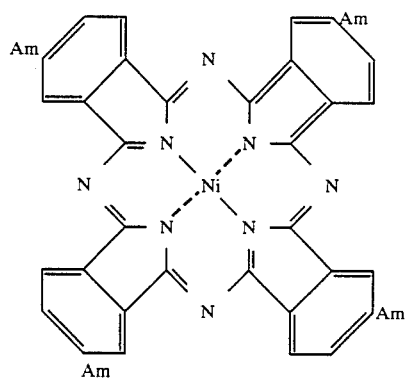
B-9

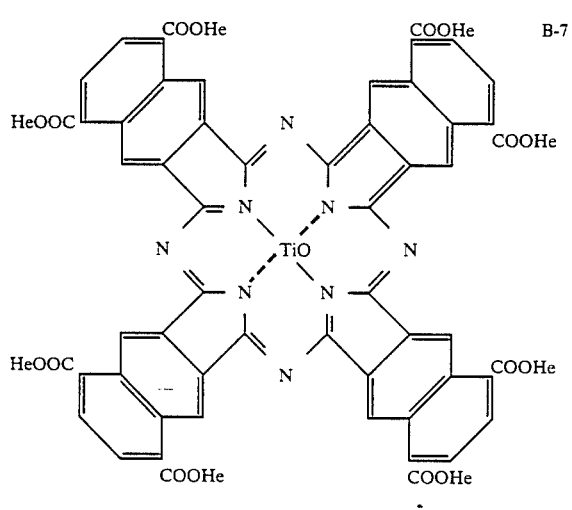
B-7

| | |
|---|---|
| Product of Mitsui Toastu (PA-1006) Benzenedithiol-Ni Complex | B-10 |
| Product of Nippon Kanko Shikiso (NK-123) Polymethine Dye | A-1 |
| Product of Nippon Kanko Shikiso (NK-125) Polymethine Dye | A-2 |
| Product of Nippon Kanko Shikoso (NK-126) Polymethine Dye | A-3 |
| Product of Nippon Kanko Shikiso (NK-2014) Polymethine Dye | A-4 |
| Product of Nippon Kayaku (IRG-002) Amine Compound | A-5 |

Table VIII

| No. | Dye (A) | Dye (B) | A/B |
|---|---|---|---|
| Ex. 23 | A-1 | B-1 | 50/50 |
| Ex. 24 | A-1 | B-2 | 75/25 |
| Ex. 25 | A-2 | B-3 | " |
| Ex. 26 | A-3 | B-4 | " |
| Ex. 27 | A-3 | B-5 | " |
| Ex. 28 | A-4 | B-6 | " |
| Ex. 29 | A-4 | B-7 | 25/75 |
| Comp. Ex. 14 | A-4 | — | 100/0 |
| Comp. Ex. 15 | A-4 | B-10 | 75/25 |
| Comp. Ex. 16 | — | B-9 | 0/100 |
| Comp. Ex. 17 | A-5 | B-10 | 50/50 |

TABLE IX

| | | Ex. 23 | Ex. 24 | Ex. 25 | Ex. 26 | Ex. 27 | Ex. 28 | Ex. 29 | Comp. Ex. 14 | Comp. Ex. 15 | Comp. Ex. 16 | Comp. Ex. 17 |
|---|---|---|---|---|---|---|---|---|---|---|---|---|
| Reflectivity R (%) | $R_A$ | 32 | 32 | 38 | 35 | 38 | 38 | 38 | 38 | 38 | — | 3 |
| | $R_B$ | 19 | 21 | 22 | 23 | 20 | 21 | 20 | — | 4 | 18 | 4 |
| | $R_{A+B}$ | 27 | 30 | 34 | 32 | 32 | 35 | 27 | 38 | 28 18 | 3 | |
| λ max (nm) | λ max. A | 840 | 840 | 782 | 805 | 805 | 828 | 828 | 828 | 828 | — | 980 |
| | λ max. B | 805 | 822 | 818 | 830 | 828 | 825 | 822 | — | 905 | 685 | 905 |
| Reciprocal of Recording Sensitivity (nS) | | 105 | 95 | 92 | 97 | 88 | 89 | 111 | 63 | 120 | 225 252 | |
| Read-out C/N (dB) | | 55 | 54 | 56 | 55 | 55 | 54 | 54 | 55 | 55 | 54 | — |
| Light Durability C/N (dB) | $R'_{A+B}$ (%) | 27 | 29 | 33 | 32 | 32 | 34 | 26 | 3 | 3 | 18 | 2 |
| | | 55 | 54 | 55 | 55 | 55 | 54 | 54 | — | — | 54 | — |
| Wet-heat Resistance C/N (dB) | $R'_{A+B}$ (%) | 27 | 29 | 33 | 32 | 32 | 35 | 27 | 38 | 25 | 17 | 2 |
| | | 55 | 54 | 56 | 54 | 55 | 54 | 53 | 55 | 52 | 53 | — |

Note: The letters A, B and (A+B) in Table IX indicate the values of (A) only, that of (B) only and that of mixture of (A) and (B), respectively. The value of the reflectivity means maximum reflectivity at 600–900 mm wavelength.

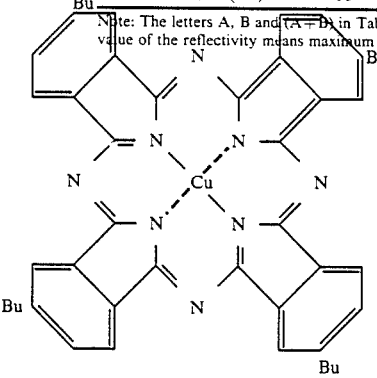
B-8

It has been found that the optical recording media having a thin film layer of organic dyes of the Examples above have a large initial reflectivity of 20% or more and further have an excellent light durability that the reflectivity after irradiation with sunshine carbon arc Fade-O-Meter for 200 hours is 70% or more of the initial reflectivity. In particular, the combination of two or more different dyes is especially preferred for use in the optical recording media of the present invention.

Particularly, when the dye mixture satisfied the certain mutual $\lambda_{max}$ relationship, there are obtained optical recording media having excellent light durability and wet-heat resistance.

Further, when at least one dye of one component is a polymethine dye and at least one dye of the other component is an aza-annulene dye, there are obtained optical recording media having excellent characteristics and excellent light durability and wet-heat resistance.

What we claim is:

1. An optical recording medium having a thin film layer consisting mainly of an organic dye and formed on a substrate, characterized in that said thin film layer consists mainly of a dye mixture comprising a polymethine dye (A) and an aza-annulene dye (B), the polymethine dye (A) being selected from those represented by the general formula (III) and (IV):

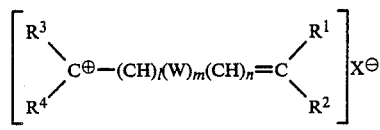

[III]

wherein each of $R^1$, $R^2$, $R^3$ and $R^4$ represents hydrogen atom, alkyl group, substituted alkyl group, aryl group, substituted aryl group or heterocyclic group W represents a cyclohexene ring or a condensed ring containing at least one cyclohexene ring or at least one substituted cyclohexene ring; of the 1 and n represents 0 or an integer of 1 to 3 and satisfies the relation $0 < l+n < 5$; m is a number of 0 or 1; and $X^-$ represents an anion; and,

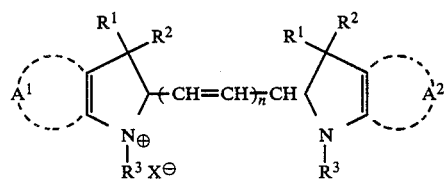

[IV]

wherein n is 0 or an integer of from 1 to 3; $R^1$, $R^2$ and $R^3$ may be the same or different and each represents an alkyl group having 1 to 6 carbon atoms; X represents halogen, perhalogenate, boron tetrafluoride, toluenesulfonate or alkyl sulfate; each of $A^1$ and $A^2$ represents benzene ring or naphthyl ring and each of these rings may be substituted by any of alkyl groups, alkoxy groups, hydroxy group, carboxyl group, halogen, aryl groups and alkylcarboxyl groups, and the aza-annulene dye (B) being selected from those represented by the general formula and:

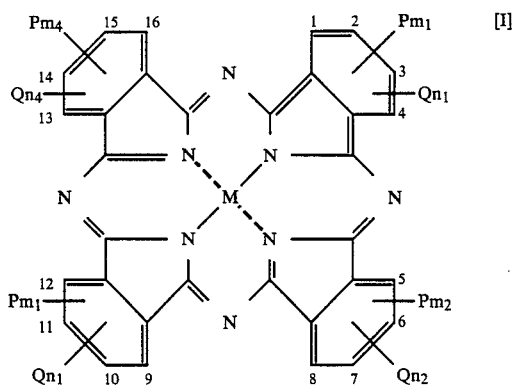

wherein the numerals 1 to 16 denote the respective carbon atom positions; each of $m_1$, $m_2$, $m_3$ and $m_4$ represents the number of groups P which may be same or different and the number is an integer of from 0 to 4; each of $n_1$, $n_2$, $n_3$ and $n_4$ represents the number of groups Q which may be the same or different and the number is an integer of from 0 to 4; two or more of the carbon atoms bearing the numbers 1 to 16 are substituted amino, imino, nitro, cyano, sulfonic acid, sulfonate, sulfonyl, hydroxyl and halogen; 3 to 8 of the carbon atoms bearing the numbers 1 to 16 are substituted by the groups Q; Q is represented by $(Z)^rR$ wherein Z represents $-CH^2-$, $-O-$, $-CONH-$ or $-COO-$ and R represents a straight or branched alkyl group or aryl group and r represents a number of 0 or 1; and M represents hydrogen, metal, metal oxide, metal hydroxide or metal halide;

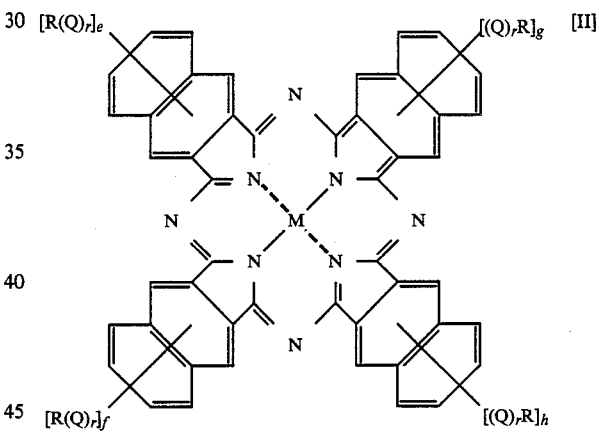

wherein $-[(Q)rR]$ represents substituents which may be same or different, Q is any of $-O-$, $-CONR'-$, $-NR'CO-$, $-COO-$ and $-OCO-$, wherein R' is hydrogen or alkyl group having 4 or less carbon atoms, R represents a group selected from straight or branched alkyl groups having 4 to 18 carbon atoms, and aryl and cyclohexyl groups having 6 to 18 carbon atoms; e, f, g and h represent the numbers of the respective substituents and each of them is a number of 0 to 4, (e+f+g"h) being >3; M represents hydrogen, metal, metal oxide, metal hydroxide or metal halide; and r represents a number of 0 or 1; the dyes (A) and (B) being those in which the maximum absorption wavelength $\lambda_{max}\cdot A$ (nm) of the dye (A) and the maximum absorption wavelength $\lambda_{max}\cdot B$ (nm) of the dye (B) satisfy the relation defined by the formula:

$$-80 \leq \lambda_{max}\cdot B - \lambda_{max}\cdot A \leq 300,$$

the ratio of the dye(A)/dye(B) being 95/5 to 10/90.

2. An optical recording medium according to claim 1 wherein the dyes (A) and (B) are those having a reflectivity of 10% or more at 830 nm wavelength.

3. An optical recording medium according to claim 1 wherein the initial reflectivity of the thin film layer is 20% or more and the reflectivity of the thin film layer after the irradiation for 200 hours with sunshine carbon arc Fade-O-Meter (63° C., 65% R.H.) is 70% or more of the initial refelctivity.

* * * * *